United States Patent
Endo et al.

(10) Patent No.: US 7,317,627 B2
(45) Date of Patent: Jan. 8, 2008

(54) SEMICONDUCTOR INTEGRATED CIRCUIT WITH VOLTAGE GENERATION CIRCUIT, LIQUID CRYSTAL DISPLAY CONTROLLER AND MOBILE ELECTRIC EQUIPMENT

(75) Inventors: Kazuya Endo, Higashimurayama (JP); Naoki Miyamoto, Kodaira (JP); Toshio Mizuno, Tokyo (JP); Takayuki Nakaji, Tachikawa (JP); Takatoshi Uchida, Kokubunji (JP); Kazuo Ookado, Kokubunji (JP); Yoshikazu Yokota, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 11/797,793

(22) Filed: May 8, 2007

(65) Prior Publication Data

US 2007/0211508 A1    Sep. 13, 2007

Related U.S. Application Data

(60) Continuation of application No. 11/503,234, filed on Aug. 14, 2006, now Pat. No. 7,233,511, which is a continuation of application No. 11/033,308, filed on Jan. 12, 2003, now Pat. No. 7,110,274, which is a division of application No. 10/091,405, filed on Mar. 7, 2002, now Pat. No. 6,898,096.

(30) Foreign Application Priority Data

Apr. 10, 2001 (JP) .............................. 2001-110813

(51) Int. Cl.
*H02M 1/00* (2006.01)
*H03K 3/01* (2006.01)
*G09G 3/36* (2006.01)
*G05F 1/40* (2006.01)

(52) U.S. Cl. ........................ 363/147; 327/534; 345/87

(58) Field of Classification Search ................ 363/147; 323/265, 282; 349/34, 41, 42, 158; 327/530, 327/534, 535, 538, 540; 345/84, 87, 204, 345/211; 315/169.1, 169.3
See application file for complete search history.

(56) References Cited

U.S. PATENT DOCUMENTS 5,313,583 A    5/1994    Yokota et al.
5,680,068 A    10/1997   Ochi et al.

(Continued)

FOREIGN PATENT DOCUMENTS

JP    4-371999    12/1992

(Continued)

*Primary Examiner*—Matthew V. Nguyen
(74) *Attorney, Agent, or Firm*—Mattingly, Stanger, Malur & Brundidge, PC

(57) ABSTRACT

There is to be provided a liquid crystal drive controller with a built-in power supply circuit wherein latch-up is made difficult to arise even if one amplitude level of the segment line drive voltage is set to the ground potential and the levels of other liquid crystal drive voltages are determined accordingly. A semiconductor integrated circuit with a built-in power supply circuit, wherein a negative voltage generated in a power supply circuit is applied to a substrate or a well region as a bias voltage, is provided with a switch for temporarily applying the ground potential to the substrate or well region to be biased with the negative voltage at the time of starting up the power supply circuit.

13 Claims, 13 Drawing Sheets

U.S. PATENT DOCUMENTS

| | | |
|---|---|---|
| 5,734,379 A | 3/1998 | Natsumi et al. |
| 6,369,809 B1 | 4/2002 | Shimoda et al. |
| 6,373,479 B1 | 4/2002 | Moon |
| 6,456,153 B2 | 9/2002 | Buck et al. |
| 6,727,681 B2 | 4/2004 | Morita |
| 6,778,002 B2 * | 8/2004 | Miyazaki et al. ........... 327/534 |
| 6,879,111 B2 | 4/2005 | Voto et al. |
| 6,909,413 B2 | 6/2005 | Nanno et al. |
| 6,919,873 B2 | 7/2005 | Sato et al. |
| 6,934,171 B2 * | 8/2005 | Dillon et al. ................ 363/147 |
| 7,129,679 B2 | 10/2006 | Inaba et al. |
| 7,233,304 B1 * | 6/2007 | Aratani et al. ................ 345/87 |
| 7,245,177 B2 * | 7/2007 | Fujita et al. ................ 327/543 |
| 2005/0146493 A1 | 7/2005 | Kinjo et al. |

FOREIGN PATENT DOCUMENTS

| | | |
|---|---|---|
| JP | 5-150748 | 6/1993 |
| JP | 7-181913 | 7/1995 |
| JP | 7-199148 | 8/1995 |
| JP | 8-62577 | 3/1996 |
| JP | 11-143432 | 5/1999 |

* cited by examiner

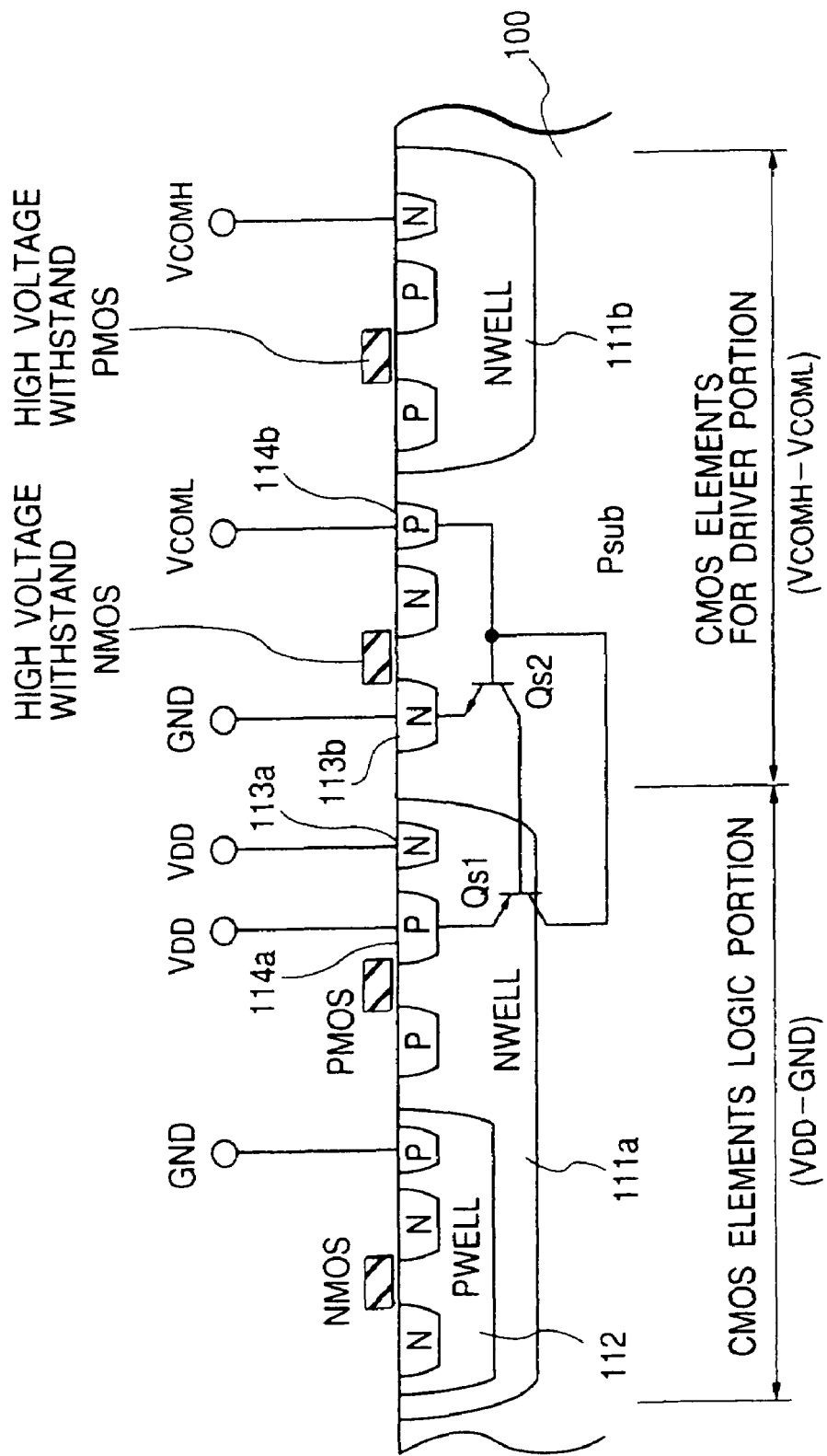

SEMICONDUCTOR INTEGRATED CIRCUIT WITH VOLTAGE GENERATION CIRCUIT, LIQUID CRYSTAL DISPLAY CONTROLLER AND MOBILE ELECTRIC EQUIPMENT

This is a continuation application of U.S. Ser. No. 11/503,234, filed Aug. 14, 2006 now U.S. Pat. No. 7,233,511, which is a continuation application of U.S. Ser. No. 11/033,308, filed Jan. 12, 2005 now U.S. Pat. No. 7,110,274, which is a divisional of U.S. Ser. No. 10/091,405, filed Mar. 7, 2002 now U.S. Pat. No. 6,898,096.

BACKGROUND OF THE INVENTION

The present invention relates to a latch-up preventive technique for use in a semiconductor integrated circuit with a built-in booster type power supply circuit for generating a voltage resulting from boosting of the source voltage, such as an LSI (large scale semiconductor integrated circuit) for liquid crystal display control with a built-in power supply circuit for liquid crystal display driver, and a technique that can be effectively applied to mobile electric equipment mounted with such an LSI.

Nowadays, as a displaying unit for mobile electric equipment including mobile telephones and pagers, a dot matrix type liquid crystal panel in which a plurality of display pixels are two-dimensionally arrayed in a matrix form for instance is usually employed, and the equipment is mounted with a display control unit, integrated into a semiconductor circuit, for controlling the displaying on this liquid crystal panel of a driver circuit for driving the liquid crystal panel, or a display control unit with such a driver circuit built into it. While such a display control unit integrated into a semiconductor circuit can operated on a voltage of only 5 V or below, displaying on a liquid crystal panel requires a drive voltage of 5 to 40 V. For this reason, the display control unit often has a built-in power supply circuit for liquid crystal display driver for generating a voltage resulting from boosting of the source voltage to drive the liquid crystal panel. More specifically, as shown in FIG. 14, the liquid crystal panel is driven with a segment line drive voltage SEG having an amplitude of about 6 V and a common line drive voltage COM whose amplitude is a few times as great as that (about 40 V).

Power generating systems for a power supply circuit for liquid crystal display driver conceivably include one in which the lower amplitude level VCOML of the common line drive voltage COM is set to the ground potential ground potential (0 V), other levels VCOMH, VSEGH and VSEGL are determined with reference to that and the required voltage is generated by a booster type power supply circuit as shown in FIG. 14A, and another in which the higher amplitude level VCOMH of the common line drive voltage COM is set to the source voltage Vcc (e.g. 5 V), other levels VCOMH, VSEGH and VSEGL are determined with reference to that and the required voltage is generated by a booster type power supply circuit as shown in FIG. 14B.

As the power supply circuit for liquid crystal display driver, a reference voltage circuit or a voltage follower circuit using an operational amplifier is used, and such an operational amplifier operates on the boosted voltage as its source voltage. This, however, involves the problem of considerably high power consumption by the operational amplifier working on the boosted voltage as its source voltage, because the voltage generated by a power supply circuit of the power generation system described is at a considerably high absolute level relative to the ground.

SUMMARY OF THE INVENTION

The present inventors, in order to reduce power consumption by the power supply circuit, studied the possibility of setting the lower amplitude level VSEGL of the segment line drive voltage SEG to the ground potential (0 V), determining other levels VCOMH, VCOML and VSEGH with reference to that, and generating the voltage to be used by boosting an external source voltage as shown in FIG. 14C. However, a system illustrated in FIG. 14C was found to involve the problem that, where a CMOS circuit is used, it would be susceptible to a latch-up phenomenon.

This problem arises in the following way. Since the lower amplitude level VCOML of the common line drive voltage COM is −15 V or somewhere around that in the system illustrated in FIG. 14C, reverse biasing of the PN junction between the semiconductor substrate and the active region of elements on its surface requires biasing of the semiconductor substrate of the semiconductor chip on which this power supply circuit is to be mounted or the semiconductor region (well region) in which the common line (COM) driver circuit to a negative voltage, such as −15 V. However, in a semiconductor integrated circuit whose substrate is biased to a negative voltage, such as 15 V, no sufficient negative voltage is generated by the boost circuit immediately after the power supply is applied, the potential of the semiconductor substrate to which the voltage generated by the power supply circuit is applied becomes unstable, and this leads to susceptibility to latch-up.

This latch-up phenomenon will be explained in detail below with reference to FIG. 15. In FIG. 15, reference numeral 100 denotes a semiconductor substrate of, for instance, P-type single crystal silicon; 111a and 111b denote N-type well regions formed over the main face of this substrate; and 112, a P-type well region formed over the N-type well region 111a. Over the surface of the N-type well region 111a is formed a P-channel MOSFET constituting CMOS logic circuits (logic portion) other than driver circuits, and over the surface of the P-type well region 112 is similarly formed an N-channel MOSFET constituting CMOS logic circuits. Over the surface of the N-type well region 111b is formed a P-channel MOSFET constituting a driver circuit (driver portion), and over the surface of the P-type substrate 100 is formed an N-channel MOSFET constituting a driver circuit. The P-channel MOSFET and the N-channel MOSFET constituting the driver circuits are elements strengthened in voltage withstand by thickening the gate insulating layer or separating the gate and the source/drain from each other.

In the above-described structure, a source potential VDD is applied to the N-type well region 111a via an N-type region 113a for well feeding, and a negative voltage VCOML of −15 V or around that level, generated by a power supply circuit (not shown), is applied to the P-type substrate 100 via a P-type region 114b for power feeding.

Incidentally, in the structure described above, there is a parasitic PNP transistor Qs1 between a P-type source region 114a of the P-channel MOSFET and an N-well region 111a in the logic portion on the one hand and the P-type substrate 100 on the other. There also is a parasitic NPN transistor Qs2 between an N-type source region 113b of the N-channel MOSFET and the P-type region 114b for power feeding in the driver portion on the one hand and the P-type substrate 100 on the other. Further, both the collector and the base of the parasitic transistors Qs1 and Qs2, respectively, are the P-type substrate 100, with Qs1 and Qs2 having a parasitic thyristor structure connected in the illustrated way. For this reason, if an unstable voltage is applied as in a period T1 in FIG. 3A from the power supply circuit to the P-type region 114*b* for power feeding immediately after the power supply is applied, the substrate potential of the substrate 100 will vary, resulting in a flow of a current to the parasitic transistor Qs2, and it has been found that this may trigger a latch-up phenomenon in which the parasitic thyristors are turned on to allow the current to continue to flow.

To add, in a semiconductor integrated circuit provided with a power supply circuit of the system of FIG. 14B similarly generating a negative voltage, as the positive voltage is not so high, latch-up can be prevented with relative ease by using a semiconductor substrate of a different conduction type (e.g. the N-type) from that of the semiconductor integrated circuit having a power supply circuit of the system shown in FIG. 14A as the semiconductor substrate and applying a bias voltage providing a reverse relationship to the semiconductor substrate.

On the other hand, in a semiconductor integrated circuit provided with a power supply circuit of the system shown in FIG. 14C, the aforementioned latch-up phenomenon is averted by providing a special external terminal connected to an output terminal and connecting to this external terminal a diode which is turned on with a lower voltage than the parasitic thyristors are. Incidentally, techniques already in practice for packaging a semiconductor integrated circuit in a liquid crystal display system include the tape carrier package (TCP) method by which a chip is mounted on a printed wiring cable for connecting a liquid crystal panel to a control unit such as a CPU and the chip on glass (COG) method by which a semiconductor chip is mounted directly on a glass substrate constituting a liquid crystal panel.

Of these packaging systems, the TCP method allows effective prevention of latch-up phenomena by connecting an external diode as stated above. However, where the COG packaging method is applied, the chip and the diode are connected via wiring consisting of high resistance (indium tin oxide (ITO) or the like, formed over the surface of the glass substrate, and accordingly the parasitic resistance of the wiring is high, it is difficult for the external diode to be turned on. It has been that, for this reason, the COG packaging method involves the problem of being unable to effectively preventing the occurrence of latch-up phenomena even if an external diode is used as described above.

To add, where the aforementioned positive voltage system (FIG. 14A) is used, the semiconductor substrate can be biased with a ground potential instead of a negative voltage. This would result in application of a stable ground potential to the substrate potential supply region 114*b* shown in FIG. 15 from immediately after the beginning of power supply application, with no fear of the parasitic transistor Qs2 being turned on, so that the prevention of latch-up phenomena due to the parasitic thyristors accompanying the CMOS circuitry need not be so strict as in a negative voltage system. Other possible latch-up prevention measures include, in addition to circuits according to the present invention, a double well structure (PWELL is set to the negative voltage VCOML and the P-type the substrate 100, to the ground potential GND), deepened well regions or some contrivance the device structure in the configuration of FIG. 15, and they can prevent latch-up to some extent, but they would involve a more complex process or require a sophisticated process technique for accurately controlling the well depth, inviting an increased cost of the semiconductor chip.

The present invention is intended to a liquid crystal drive controller integrated into a semiconductor circuit, having a built-in power supply circuit and in particular permitting COG packaging, wherein latch-up is made difficult to arise even if one amplitude level of the segment line drive voltage is set to the ground potential and the levels of other liquid crystal drive voltages are determined accordingly.

Another object of the invention is to provide a semiconductor integrated circuit with a built-in power supply circuit excelling in strength against latch-up phenomena.

The above-stated and other objects and novel features of the invention will become apparent from the description in this specification and the accompanying drawings.

What follows is a brief summary of a typical aspect of the present invention disclosed in this application.

Thus, according to a first aspect of the invention under the present application, there is provided a semiconductor integrated circuit having a built-in power supply circuit (230) which, receiving an external source voltage, generates a positive voltage higher than the external source voltage and a negative voltage lower than a ground potential, further provided with a switch element (270) connected between first wiring (291) for feeding the negative voltage as a bias voltage for a semiconductor substrate and second wiring (292) for supplying the ground potential.

More specifically, in the semiconductor integrated circuit with the built-in power supply circuit wherein the negative voltage (VCOML) generated by the power supply circuit (230) is applied to the semiconductor substrate or the well region as the bias voltage, there is provided the switch element (270) for temporarily applying the ground potential to the semiconductor substrate or the well region, which should otherwise be biased with the negative voltage, at the time of starting up the power supply circuit.

The means described above, by making the switch element temporarily conduct at the time of starting up the power supply circuit, can avoid the application of the unstable output voltage of the power supply circuit to the semiconductor substrate as the bias voltage at the time of starting up the power supply circuit, and therefore it is possible to prevent latch-up which would be invited by a flow of current to the parasitic thyristors ensuing from the oscillation of the bias potential of the semiconductor substrate at the time of starting up the power supply circuit.

Preferably, the switch element may be so configured as to be made conduct temporarily at the time of starting up the power supply circuit to set the potential of the semiconductor substrate, to which the negative voltage should otherwise be applied, temporarily to the ground potential. This makes it unnecessary, at the time of starting up the power supply circuit, to enter from outside the signal to make the switch element conduct temporarily.

Also preferably, there may be provided a control circuit for generating a control signal for making the switch element temporarily conduct in accordance with a control signal for starting up the power supply circuit. As this control circuit, a reset circuit can be used. This enables the placing of the switch element to be readily synchronized with the startup of the power supply circuit and thereby the potential of the semiconductor substrate to be stabilized or fixed at the optimal timing.

Also, the switch element may preferably be composed of a high voltage withstand MOSFET. This can contribute to enhancing the durability of the semiconductor integrated circuit.

According to a second aspect of the invention under the present application, there is provided a liquid crystal display control unit integrated into a semiconductor circuit provided with a power supply circuit for liquid crystal display driver which, receiving an external source voltage, generates a voltage to be applied to segment electrodes of a liquid crystal panel, a positive voltage, higher than the external source voltage, to be applied to common electrodes of the liquid crystal panel and a negative voltage lower than a ground potential, further provided with: a switch element connected between first wiring for feeding the negative voltage as a bias voltage for a substrate and second wiring for supplying the ground potential.

The means described above, by making the switch element conduct temporarily at the time of starting up the power supply circuit, can avoid the application of the unstable output voltage of the power supply circuit to the semiconductor substrate as the bias voltage at the time of starting up the power supply circuit, and therefore it is possible to prevent latch-up which would be invited by a flow of current to the parasitic thyristors ensuing from the oscillation of the bias potential of the semiconductor substrate at the time of starting up the power supply circuit.

Preferably, the switch element may be so configured as to be made to conduct temporarily at the time of starting up the power supply circuit to set the potential of the semiconductor substrate, to which the negative voltage should otherwise be applied, temporarily to the ground potential. This makes it unnecessary, at the time of starting up the power supply circuit, to enter from outside the signal to make the switch element conduct temporarily.

Also preferably, there may be provided a control circuit for generating a control signal for making the switch element conduct temporarily in accordance with a control signal for starting up the power supply circuit. As this control circuit, a reset circuit can be used. This enables the placing of the switch element to be readily synchronized with the startup of the power supply circuit and thereby the potential of the semiconductor substrate to be stabilized or fixed at the optimal timing.

Also, the switch element may preferably be composed of a high voltage withstand MOSFET. This can contribute to enhancing the durability of the semiconductor integrated circuit.

Further in the liquid crystal display control unit also provided with a segment drive circuit for supplying signals for driving segment electrodes of the liquid crystal panel on the basis of a voltage generated by the power supply circuit and a common drive circuit for signals for driving common electrodes of the liquid crystal panel on the basis of a voltage generated by the power supply circuit, elements constituting the common drive circuit may consist of MOSFETs higher in voltage withstand than the elements constituting the power supply circuit for liquid crystal display driver, and the switch element may consist of a voltage withstand MOSFET having the same structure as the elements constituting the common drive circuit. This would result in the formation of a switch element capable of stabilizing or fixing the potential of the semiconductor substrate at the time of starting up the power supply circuit without having to add any new process.

The liquid crystal display control unit may also be provided with a first operating mode in which liquid crystal displaying is performed in a state of a source voltage being supplied from outside and a second operating mode in which liquid crystal displaying is not performed in a state of a source voltage being supplied from outside, wherein, when shifting from the second operating mode to the first operating mode, the switch element is made to conduct temporarily to temporarily apply the ground potential to the substrate, to which the negative voltage should be applied. Or alternatively, the liquid crystal display control unit may also be provided with an oscillating circuit, a first operating mode in which the oscillating circuit is operated to perform liquid crystal displaying in a state of a source voltage being supplied from outside and a third operating mode in which the operation of the oscillating circuit is stopped not to perform liquid crystal displaying, wherein, when shifting from the third operating mode to the first operating mode, the switch element is made to conduct temporarily to set the potential of the substrate, to which the negative voltage is to be applied, temporarily to the ground potential. This can prevent the occurrence of latch-up not only at the time of starting up power supply but also when the internal operating mode varies.

An external terminal to which a signal for on/off control of the switch element is inputted may also be provided. This would make possible latch-up prevention without having to provide inside the liquid crystal display control unit a circuit for generating a signal for controlling the switch element to stabilize or fix the potential of the semiconductor substrate, facilitate designing of the circuitry of the liquid crystal display control unit, and serve to reduce the chip cost.

According to a third aspect of the invention under the present application, there is provided mobile electric equipment provided with the liquid crystal display control unit having the above-described configuration, a liquid crystal panel to perform displaying in a dot matrix system in accordance with a signal generated by the segment drive circuit and a signal generated by the common electrode drive circuit; and a battery for providing the source voltage of the liquid crystal display control unit. This makes it possible to realize mobile electric equipment with high display picture quality, consuming less power and capable of operating on a battery for many hours.

BRIEF DESCRIPTION OF THE DRAWINGS

FIG. 15 shows a section of a semiconductor substrate, representing an example of device structure for the liquid crystal panel controller driver.

DETAILED DESCRIPTION OF THE PREFERRED EMBODIMENTS

Preferred embodiments of the present invention will be described below with reference to accompanying drawings.

Figure 1:
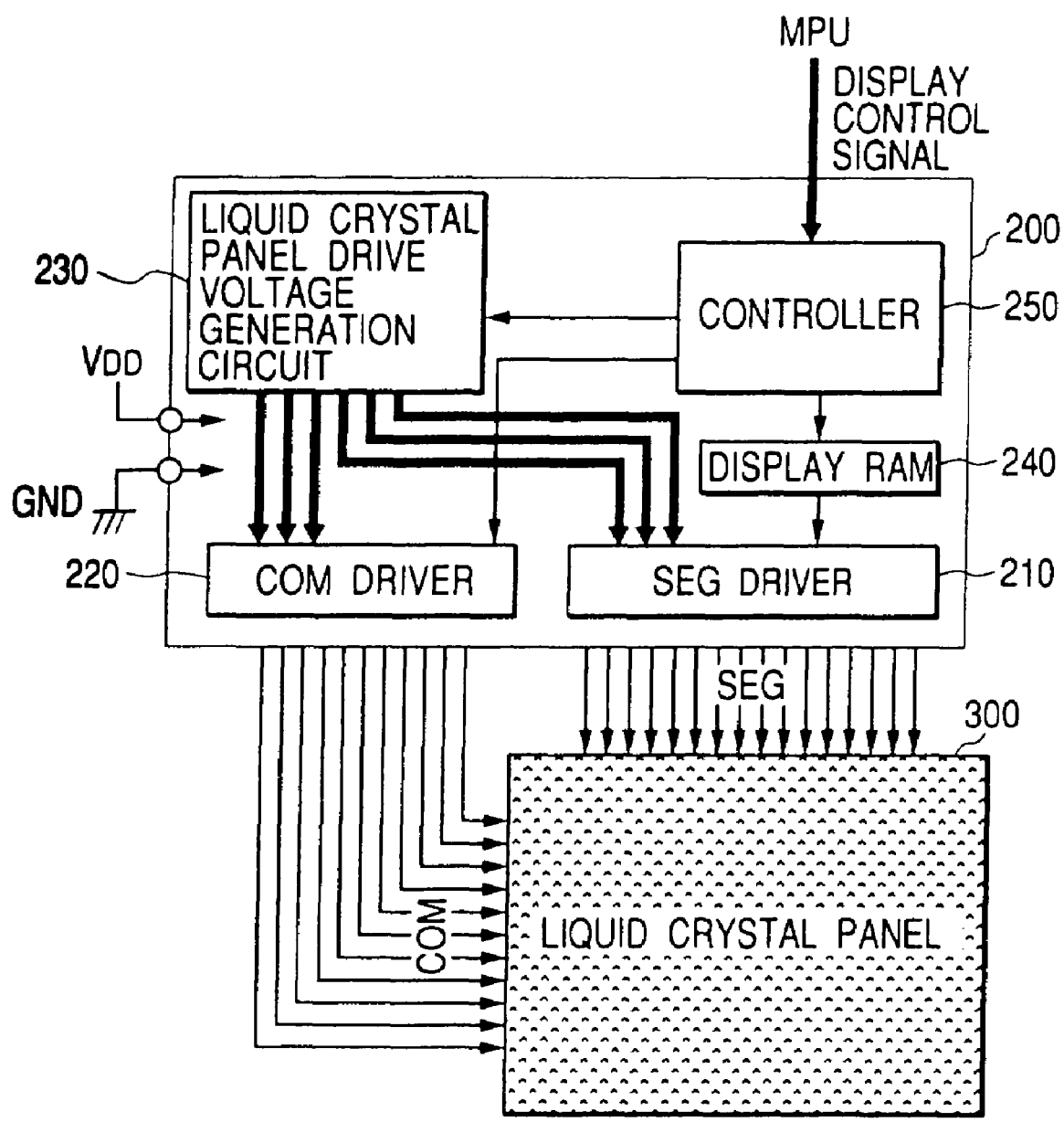
FIG. 1 is a block diagram illustrating the configuration of a liquid crystal display unit consisting of a liquid crystal panel controller driver with a built-in power supply circuit of a booster type to which the invention can be effectively applied and a liquid crystal panel driven by this LSI.

First, as an example of a semiconductor integrated circuit having a built-in power supply circuit of booster type to which the invention can be effectively applied, a semiconductor integrated circuit 200 for liquid crystal display control will be described with reference to FIG. 1. FIG. 1 is a block diagram illustrating the configuration of a liquid crystal display unit consisting of the liquid crystal panel controller driver 200 with the built-in power supply circuit of booster type to which the invention can be effectively applied and a liquid crystal panel 300 driven by this driver.

In FIG. 1, reference numeral 200 denotes the liquid crystal panel controller driver LSI, and 300, the liquid crystal panel driven by this liquid crystal panel controller driver LSI 200. The liquid crystal panel controller driver LSI 200 is provided with, among other elements, a segment (SEG) driver 210 for driving the segment electrodes (segment lines) of the liquid crystal panel 300; a common (COM) driver 220 for driving the common electrodes (common lines) of the liquid crystal panel 300, a power supply circuit for liquid crystal display driver 230 for generating drive voltages required by these drivers; a display RAM 240 for storing by a bit map method video data to be displayed on the liquid crystal panel 300; a controller 250 for controlling the whole chip of the chip in accordance with instructions from an external microprocessor (hereinafter sometimes abbreviated to MPU or CPU) or the like. These circuits are configured on a single semiconductor chip such as single crystal silicon. The LSI 200 further has an external terminal to which a source voltage VDD is supplied and another external terminal to which a ground potential is supplied.

Though not illustrated, this liquid crystal panel controller driver 200 is further provided with an address counter for generating addresses for the display RAM 240, a logic operating means for performing logic operations for watermark displaying and superimposed displaying on the basis of data read out of the display RAM 240 and new display data supplied from an external MPU or elsewhere, and a timing generation circuit for generating operation timing signals for the SEG driver 210 and the COM driver 220.

Any appropriate control system can be used for the controller 250 as desired, such as one in which, upon receipt of a command code from an external MPU, this command is decoded to generate a control signal, or another in which a plurality of command codes and a register for designating a command to be executed (known as an index register) are provided in the controller in advance and an MPU designates the command to be executed by writing into the index register to generate a control signal.

Under control by the controller 250 configured as described above, the liquid crystal panel controller driver 200, when displaying on the liquid crystal panel 300 in accordance with an instruction and data from the external MPU, processes drawing to write display data successively into the display RAM 240 and reading to read display data successively out of the display RAM 240, causing the drivers 210 and 220 to supply signals to be applied to the segment electrodes and signals to be applied to the common electrodes of the liquid crystal panel 300, and thereby carries out liquid crystal displaying.

Figure 2:
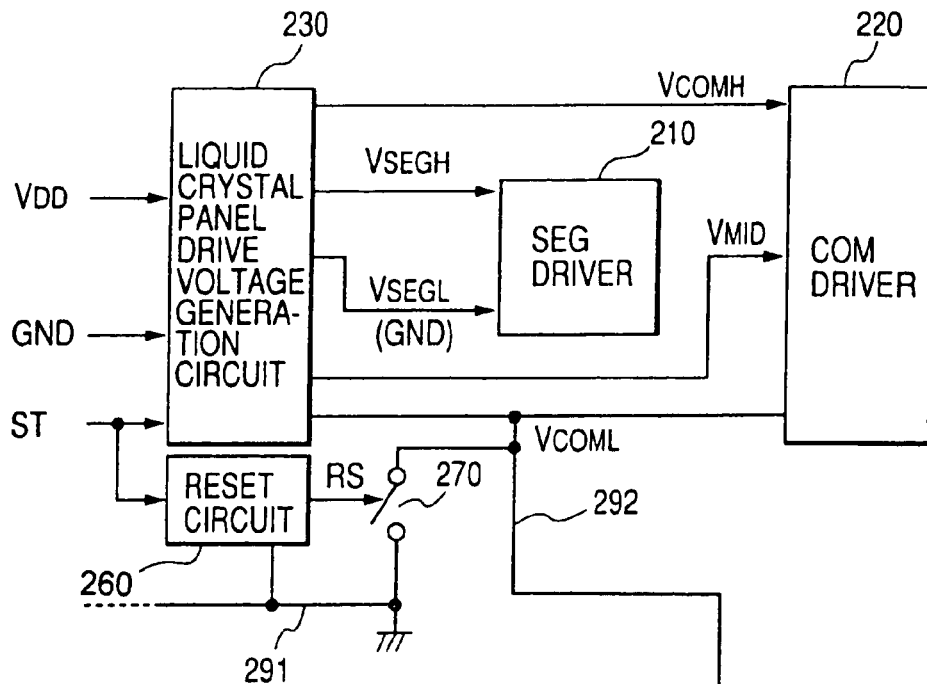
FIG. 2 is a block diagram illustrating an example of reset circuit for latch-up prevention in the liquid crystal panel controller driver to which the invention is applied.
Figure 2:
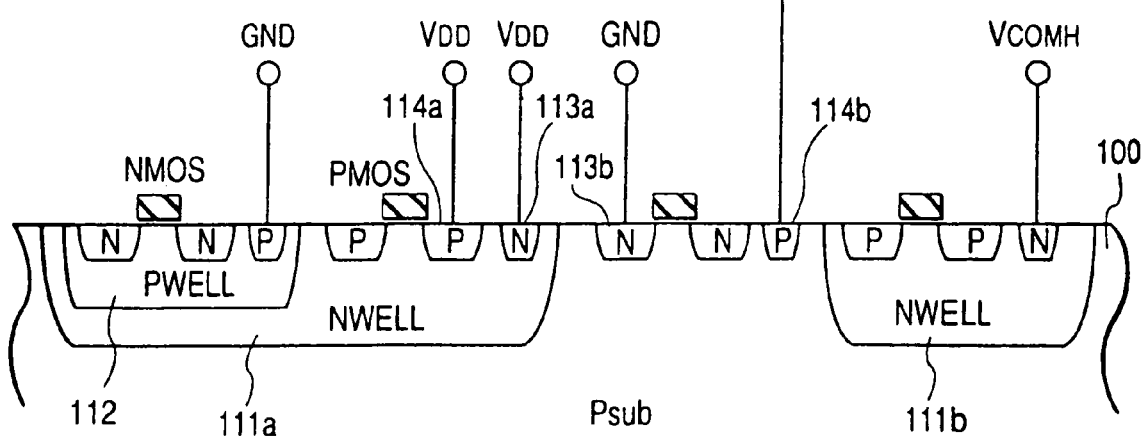

FIG. 2 is a block diagram illustrating an example of reset circuit as a control circuit for latch-up prevention in the liquid crystal panel controller driver to which the invention is applied. Reference numeral 210 denotes the SEG driver; 220, the COM driver; and 230, the power supply circuit for liquid crystal display driver. A negative common voltage VCOML, which may be −15 V for instance, generated by the power supply circuit for liquid crystal display driver 230 is supplied to the COM driver 210 and at the same time is applied to the semiconductor substrate 100 as the substrate bias voltage.

This embodiment is provided with a reset circuit 260 controlled with a power supply circuit startup signal ST supplied from the controller 250 to actuate the power supply circuit for liquid crystal display driver 230 at the time of applying power supply or when returning to a regular operating state from a sleep mode or standby mode, and a ground short-circuiting switch 270 for fixing the substrate potential (first reference voltage) to the ground potential for a short period of time (e.g. 3 to 5 milliseconds) at the time of starting up the power supply circuit with a signal RS from the reset circuit 260 until the operation of the power supply circuit is stabilized.

To the source (or drain) of this ground short-circuiting switch 270, which is configured of a MOSFET for instance, is connected ground wiring 291, and to its drain (or source) is connected wiring 292 for supplying a negative voltage (second reference voltage) VCOML from the power supply circuit 230 to the P-type region 114b for power feeding on the substrate surface as the substrate bias voltage. It is preferable for the ground short-circuiting switch 270, as a negative high voltage VCOML is applied to it while the power supply circuit 230 is being started up, to be configured of a high voltage withstand MOSFET. Further, it is preferable to add some contrivance to the ground short-circuiting switch 270 to reduce its ON-state resistance, such as making its gate width greater than elements constituting the logic circuit. As the device structure itself in FIG. 2 is the same as in FIG. 15, the description concerning FIG. 15 can be referred to for the description of the structure here, which therefore is dispensed with.

Figure 3A:
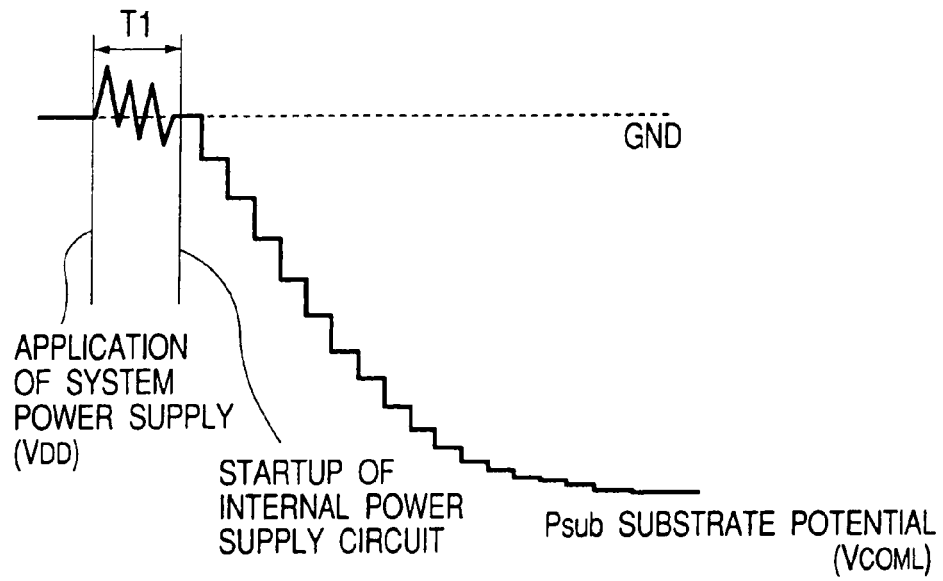
FIGS. 3(A) and 3(B) are waveform diagrams illustrating how the substrate potential varies with the presence or absence of a reset circuit 260 and a ground short-circuiting switch.
Figure 3B:
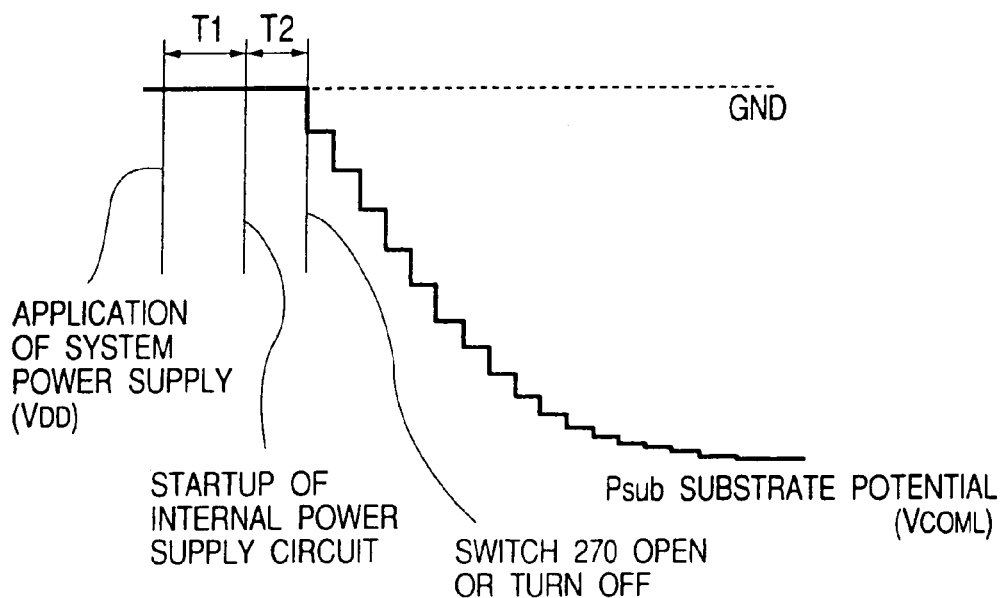

FIG. 3 illustrates how the substrate potential varies with the presence or absence of these reset circuit 260 and ground short-circuiting switch 270. Where there is neither the reset circuit 260 nor the ground short-circuiting switch 270, during the period T1 in FIG. 3A from the time the power supply to the system is applied until the power supply circuit 230 is started up, a current that would invite latch-up may flow as a consequence of a variation in substrate potential. By contrast, if there are the reset circuit 260 and the ground short-circuiting switch 270, the ground short-circuiting switch 270 is on during the period (T1+T2) in FIG. 3B until a prescribed length of time T2 elapses from the time the power supply to the system is applied and then the power supply circuit 230 is started up, the substrate potential is fixed to the ground potential GND. As a result, the current that might invite latch-up is prevented from flowing to the substrate.

Figure 4:
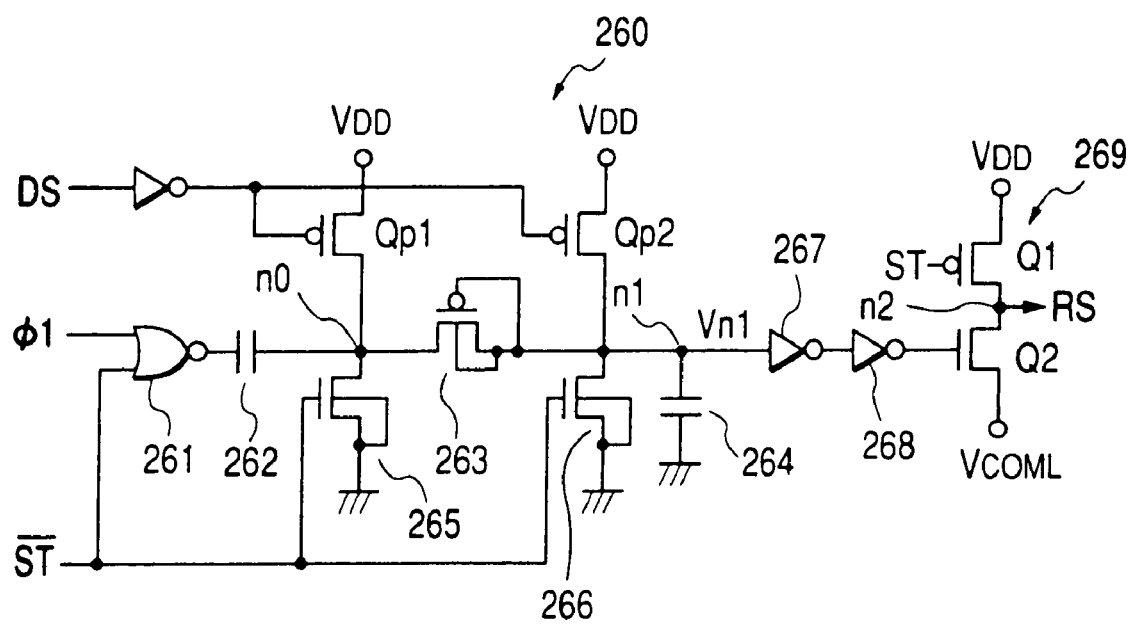
FIG. 4 is a circuit diagram illustrating a specific example of circuitry of the reset circuit.

FIG. 4 illustrates a specific example of circuitry of the reset circuit 260. In FIG. 4, the MOSFET sign marked with a circle in the gate part represents a P-channel type MOSFET, the MOSFET sign with no such mark represents an N-channel type MOSFET.

The reset circuit 260 in this embodiment is provided with a NOR gate 261 to one of whose input terminals is inputted a signal/ST resulting from the inversion of a startup signal ST for the power supply circuit and to the other is inputted a clock signal φ1 (or φ2) to be supplied to the power supply circuit; a capacitance 262 for boosting use connected to the output terminal of the NOR gate 261; a MOSFET 263 to function as a diode connected to the other terminal of the capacitance 262; a capacitance 264 for storage use connected between the drain of the MOSFET 263 and the grounding point; a switch MOSFET 265 connected between the other terminal of the capacitance 262 and the grounding point for boosting use and to whose gate is applied the startup signal/ST; a switch MOSFET 266 connected in parallel with the capacitance 264 for storage use and to whose gate is applied the startup signal/ST; a first inverter 267 whose input terminal is connected to the charging side terminal (node n1) of the capacitance 264 for storage use; a second inverter 268 for inverting the output of the inverter 267; and a third inverter 269 for inverting the output of the inverter 268, and a charge pump is composed of the capacitance 262 for boosting use, the MOSFET 263 and the capacitance 264 for storage use. Between the node n1 and a source voltage terminal VDD and between a connecting node n0 of the MOSFETs 263 and 265 and another source voltage terminal VDD are respectively connected MOSFETs QP1 and QP2 for pull-up use, each subjected to on/off control by the inverted signal/DS of the display start signal DS.

Out of the inverters 267 through 269 above, the third inverter 269 of the final stage is composed of a P-channel MOSFET Q1 and an N-channel MOSFET Q2 connected in series between the terminal of the source voltage VDD and that of the boosted voltage VCOML. The startup signal ST is applied to the gate of P-MOS Q1, and the output signal of the inverter 268 of the stage before to the gate of N-MOS Q2. The reason why the source voltage on the low potential side of the inverter 269 is the boosted voltage VCOML is that the MOSFET constituting the ground short-circuiting switch 270 is thereby turned off without fail in a state wherein the boosted voltage VCOML is applied to the substrate as the bias voltage, i.e. it is thereby ensured that the low level of the control signal for the short-circuiting switch 270 be VCOML.

Next will be described with reference to FIG. 5 the operation of the reset circuit 260 at the time applying power supply.

When the source voltage VDD is applied, P-MOS Q1 which constitutes the inverter 269 at the final stage of the reset circuit 260 is turned on because the startup signal ST is at a low level immediately after the application of power supply. Since displaying is not yet started, a high level display control signal/DS keeps the MOSFETs QP1 and QP2 for pull-up use off and, because the startup signal/ST is at a high level (VDD) immediately after the application of power supply, the switches 265 and 266 are turned on to keep the potential Vn1 of the charging node n1 of the charge pump is 0 V, with the result that the output of the inverter 267 is at a high level (VDD) and that of the inverter 268, at a low level (GND). This causes N-MOS Q2 to be turned off. Consequently, the ground short-circuiting switch 270 is turned on. As a result, during the period T1 immediately after the application of power supply, in which the startup signal ST is at a low level, the ground potential is applied to the substrate 100 via the switch 270 which is on, and that level is fixed. This serves to prevent any latch-up from occurring during the period T1.

Figure 5:
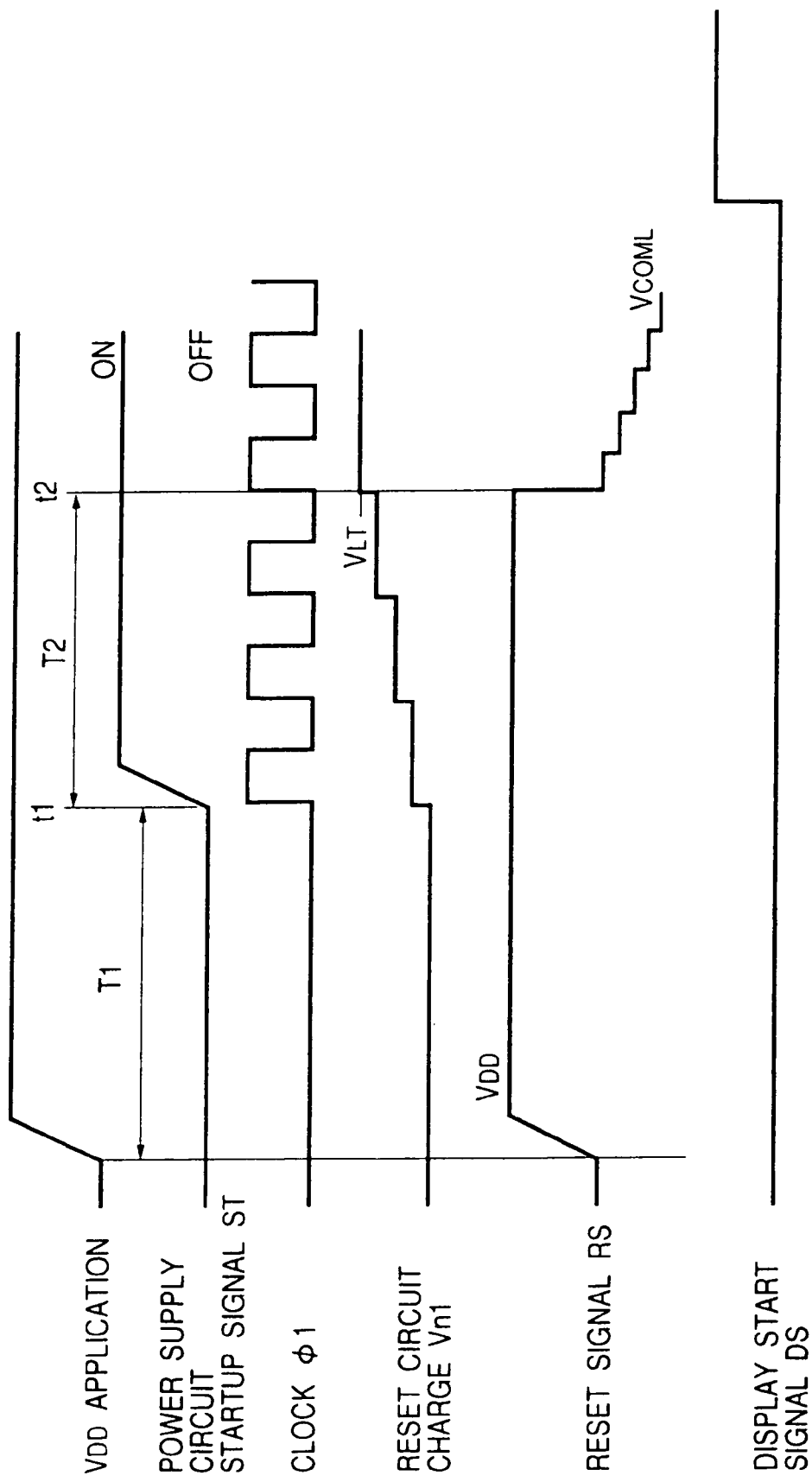
FIG. 5 is a timing chart showing the operation timing of the reset circuit.

Next, after the lapse of the period T1 following the application of power supply, the startup signal ST of the power supply circuit 230 is varied to a high level (at timing t1 in FIG. 5). Then, the switches 265 and 266 are turned off, and the NOR gate 261 is opened. Further, in synchronism with this, voltage boosting clocks φ1 and φ2 are supplied to the power supply circuit 230 from an oscillating circuit (not shown) and, as the power supply circuit 230 begins a boosting action, this voltage boosting clock φ1 (or φ2) is supplied to the reset circuit 260. Then this clock is supplied to the charge pump consisting of the capacitances 262 and 264 and the diode MOSFET 263 via the open NOR gate 261, the charge pump begins a boosting action, and the potential Vn1 of the charging node n1 rises gradually (period T2 in FIG. 5).

On the other h and, the variation of the startup signal ST to a high level then results in keeping, even if P-MOS Q1 of the final inverter 269 is turned off, N-MOS Q2 off as well, a charge stored in an output node n2 maintains the ground short-circuiting switch 270 in an ON state. Incidentally, as the period T2 set as short as 3 to 5 ms, the charge of the output node n2 of the inverter 269 does not leak during the period to turn off the ground short-circuiting switch 270. This keeps the ground potential being continuously applied to the substrate 100 to prevent any latch-up from occurring during the period T2.

After the lapse of the period T2 following the variation of the startup signal ST to the high level (at the timing t2 in FIG. 5), the potential Vn1 of the charging node n1 of the charge pump surpasses the logical threshold of the inverter 267. Then, the output of the inverter 267 varies to a low level, and that of the inverter 268 to a high level to turn on N-MOS Q2 of the final inverter 269 and to vary the output reset signal Rs to VCOML. This results in turning off the ground short-circuiting switch 270, the boosted voltage VCOML of the power supply circuit 230, which has begun to be supplied is applied to the substrate 100.

Incidentally, as N-MOS Q2 is turned on before this negative voltage VCOML is fully stabilized, the level of the reset signal RS continues to vary with the boosted voltage VCOML for some time even after the lapse of the period T2. However, because this variation is interlocked with the variation of the bias voltage supplied to the substrate 100 via the ground short-circuiting switch 270, the ground short-circuiting switch 270 remains in an OFF state while the bias voltage continues to vary. After that, as the signal DS to instruct the start of liquid crystal displaying is raised to a high level and its inverted signal/DS is reduced to a low level, the MOSFETs QP1 and QP2 for pull-up use are turned on to hold the potentials of the nodes n0 and n1 at VDD during the display period, with the result that the reset signal RS remains at a low level (VCOML) even if the supply of the clock φ1 to the reset circuit 260 is stopped. Stopping the clock results in stopping the operation of the charge pump of the reset circuit, thereby saving wasteful power consumption.

Whereas the operation of the reset circuit at the time of power supply application has been described so far, such an LSI as a liquid crystal controller driver for use in a mobile telephone of the like may have a built-in oscillating circuit for generating the voltage boosting clock $\phi1$ and $\phi2$ and operation clocks for the logic portion (controller), and the very operation of the oscillating circuit would be stopped in a prescribed mode in which liquid crystal displaying and logic operations are not needed (hereinafter referred to as the sleep mode), such as in the waiting mode of a mobile telephone, or the operation of the power supply circuit for liquid crystal display driver would be stopped but the oscillating circuit kept in operation in another prescribed mode in which no liquid crystal displaying is needed but the logic portion should operate (hereinafter referred to as the standby mode). Therefore, the configuration may as well be such that, when the power supply circuit for liquid crystal display driver is to be started up to return from the sleep mode or the standby mode to the regular operating mode, the reset circuit 260 can be operated to stabilize the potential of the substrate 100 to prevent any latch-up from occurring. To add, the standby mode is used when, for instance, a mobile telephone performs periodic communication with a base station while in a waiting period.

Figure 6:
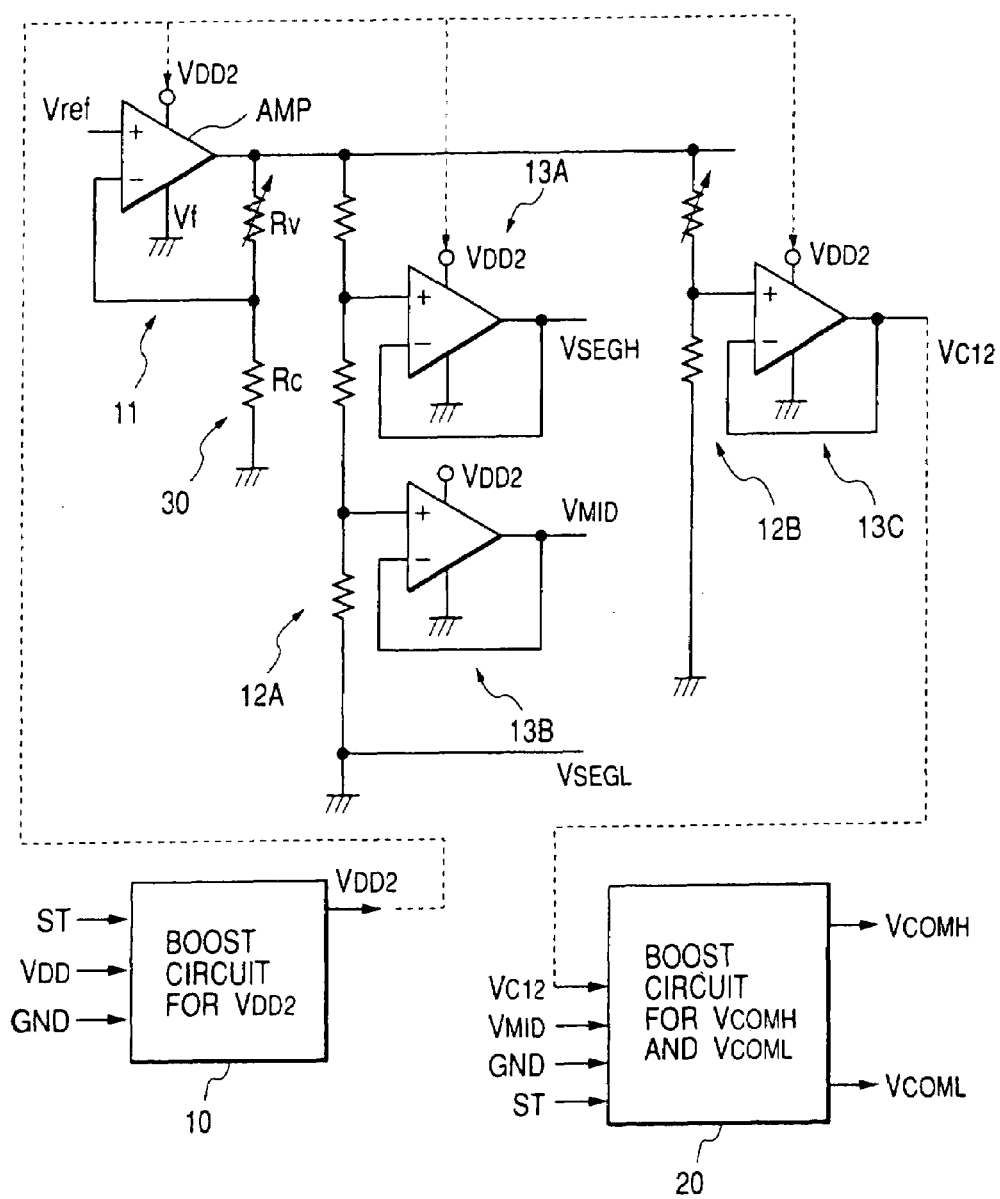
FIG. 6 is a block diagram illustrating an example of power supply circuit for liquid crystal display driver in liquid crystal panel controller driver to which the invention is applied.

FIG. 6 illustrates a specific example of booster type power supply circuit for use in this embodiment of the invention.

The power supply circuit for liquid crystal display driver shown in FIG. 6 comprises a boost circuit 10 consisting of a charge pump and other elements for boosting the source voltage VDD to generate a voltage VDD2 slightly higher than the voltage VSEGH required for driving the segment electrodes of the liquid crystal panel; a reference voltage circuit 11 operating with the voltage VDD2 boosted by the boost circuit 10 as its power source to generate a reference voltage required for generating a liquid crystal drive voltage; a voltage dividing circuit 12A consisting of a ladder resistance for subjecting the generated reference voltage to resistance division to generate reference voltages of a plurality of desired levels; voltage followers 13A and 13B operating with the voltage VDD2 boosted by the boost circuit 10 as their power source and generating the voltages VSEGH and VSEGL required for driving the segment electrodes of the liquid crystal panel and the liquid crystal central potential VMID with reference to the voltages generated by the voltage dividing circuit 12A; a second voltage dividing circuit 12B consisting of a ladder resistance for subjecting the reference voltage generated by the reference voltage circuit 11 to resistance division to generate reference voltages required for boosting on the common side; a voltage follower 13C operating with the voltage VDD2 boosted by the boost circuit 10 as its power source and generating a reference potential VCI2 for the generation of the common applied voltage of the liquid crystal panel with reference to the voltages generated by the voltage dividing circuit 12B; and a second boost circuit 20 consisting of a charge pump and other elements for generating the voltages VCOMH and VCOML required for driving the common electrodes of the liquid crystal panel on the basis of the output of the voltage follower 13C.

The reference voltage circuit 11 comprises a differential amplifier AMP to whose non-inverting input terminal is applied a reference voltage Vref for driving liquid crystal display and a variable resistance dividing circuit 30 consisting of a variable resistance Rv and a fixed resistance Rc connected between the output terminal of the differential amplifier and the grounding point. It is so configured that voltages resulting from resistance division of the output Vout of the amplifier by the variable resistance dividing circuit 30 are fed back to the inverting input terminal of the differential amplifier AMP, and supplies a voltage Vout, which is (Rv+Rc)/Rv times the reference voltage Vref. If, for instance Rv=Rc, the dividing circuit 30 can supply a voltage Vout twice as high as VREF. Also, by appropriately setting the level of the variable resistance Rv, the output voltage Vout, i.e. the segment voltage VSEGH can be regulated. To add, it is preferable for the reference voltage Vref to be supplied from a reference voltage generating circuit that is less dependent on temperature and on source voltage, such as a b and gap reference circuit for example.

Figure 14A:
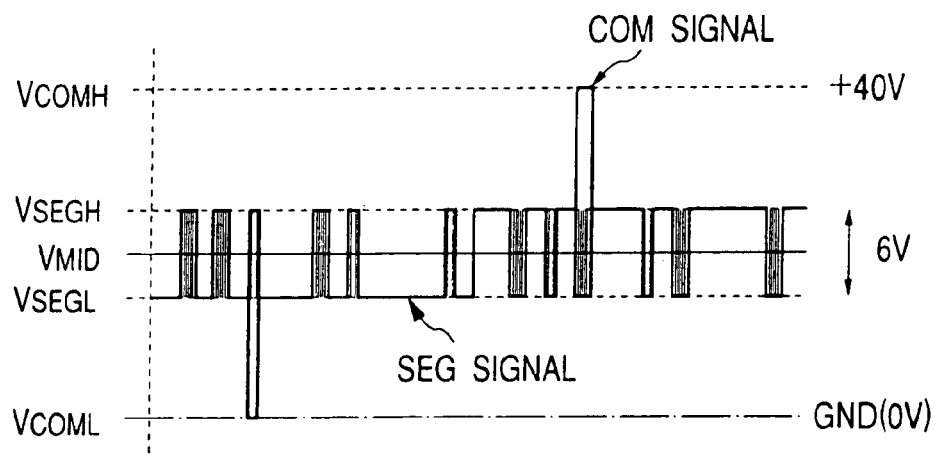
FIGS. 14(A)-14(C) are waveform diagrams illustrating level differences between a segment-applied voltage and a common-applied voltage VCOM depending on differences in liquid crystal panel drive system.
Figure 14B:
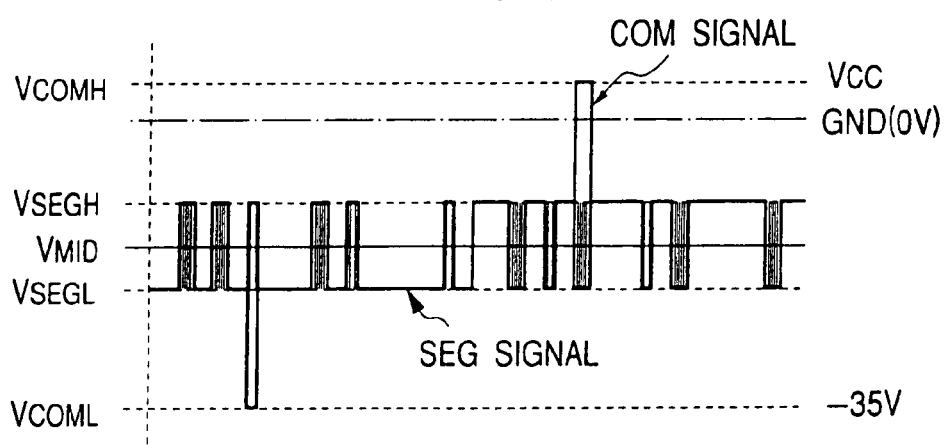

In the power supply circuit for liquid crystal display driver embodying the invention in this mode, the source voltage of the amplifiers constituting the reference voltage circuit 11 and voltage followers 13A through 13C is the voltage VDD2 boosted by the first boost circuit 10. Where the segment voltages VSEGL to VSEGH and the common voltages VCOML to VCOMH are respectively 0 to 6 V and −14 to 20 V and the external source voltage VDD is 2.7 V, the suitable range of the boosted voltage VDD2 is 6 to 8 V, i.e. 2.2 VDD to 3 VDD, and therefore not only can the power consumption of the amplifiers can be less than in those in the positive boosted voltage system (see FIG. 14A) using the boosted voltage VLCD (about 40 V) as the source voltage but also the elements constituting the amplifiers need not be so high in voltage withstand, making it possible to reduce the area occupied by the circuits.

Figure 7:
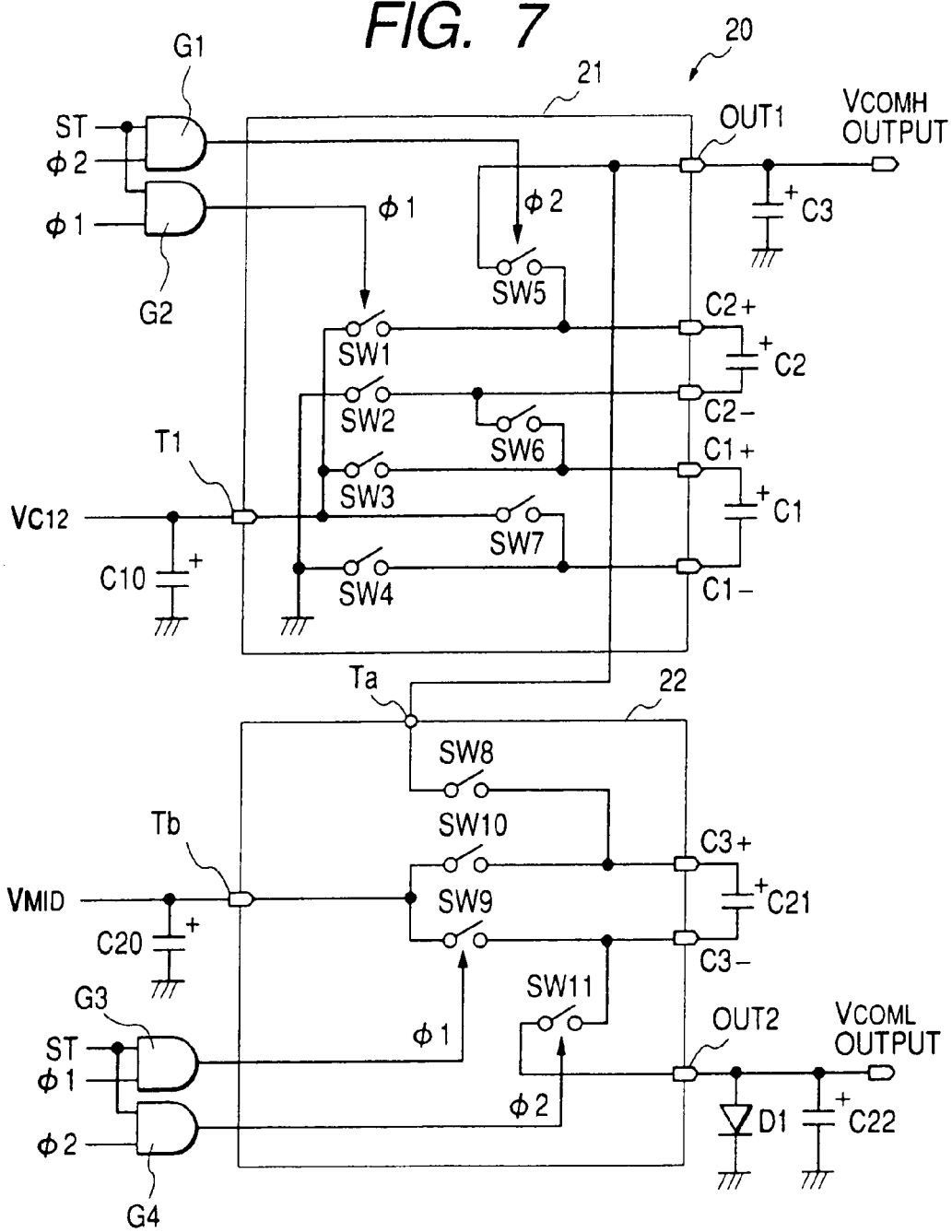
FIG. 7 is a circuit diagram illustrating an example of second boost circuit for generating a common voltage constituting a power supply circuit for liquid crystal display driver.
Figure 14C:
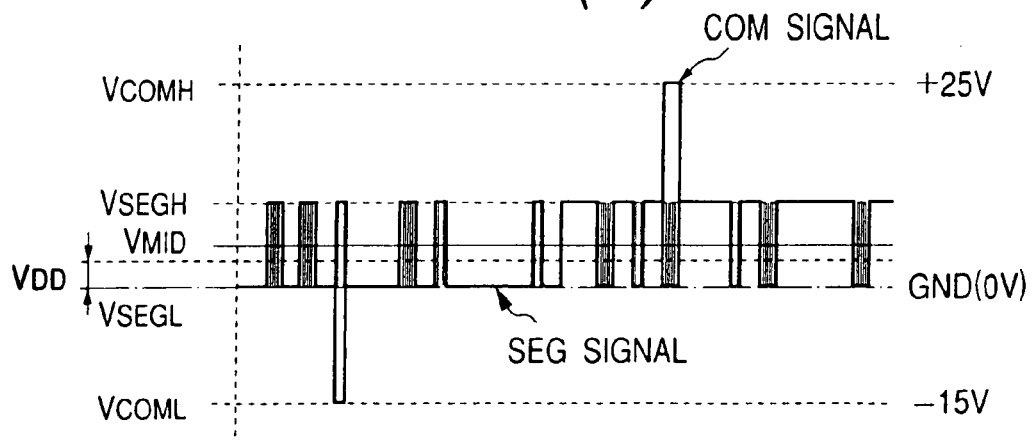

FIG. 7 illustrates a specific example of configuration of the second boost circuit 20. As reference to FIG. 14C showing the waveform of the voltage to be applied to the liquid crystal panel would reveal, generation of signals to be applied to the common electrodes requires a negative voltage VCOML a voltage whose polarity is reverse to that of the boosted voltage VCOMH, around the middle potential VMID of the liquid crystal.

In this embodiment, as shown in FIG. 7, the second boost circuit 20 is composed of a charge pump 21 for generating a common voltage VCOMH having a positive polarity and a voltage inverting circuit 22 for inverting the output voltage of the charge pump to generate a common voltage VCOML having a negative polarity. Incidentally, as the first boost circuit 10 can have the same configuration as the charge pump 21 of the second boost circuit 20, its illustration and description will be dispensed with. Further, the charge pump 21 and the voltage inverting circuit 22 in this embodiment are respectively provided with AND gates G1, G2 and G3, G4, the clock supply to which is controlled with the actuating signal ST for the power supply circuit. The configuration is such that, as long as the actuating signal ST is at a low level, the supply of the clocks $\phi1$ and $\phi2$ be cut off to perform no boosting, and when the actuating signal ST is raised to a high level, the clocks $\phi1$ and $\phi2$ be supplied to start boosting.

Figure 8:
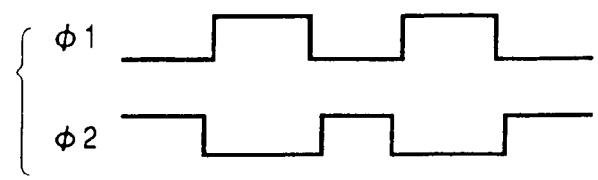
FIG. 8 is a waveform diagram illustrating an example of waveform of clock signals for operating the boost circuit in the example.

The charge pump 21 for generating the positive common voltage VCOMH is configured of switches SW1 through SW4 turned on and off by the clock signal $\phi1$, switches SW5 through SW7 turned on and off by the clock signal $\phi2$ formed not to allow its high level period to overlap that of the clock signal $\phi1$ (see FIG. 8), boost capacitances C1 and C2 to be connected in series by the switches SW5 and SW6 and a smooth capacitance C3 for output, connected to an output terminal OUT1.

The low potential side terminal C1− of the boost capacitance C1 is made connectable to the grounding point or a first reference potential terminal T1 via the switch SW4 or SW7, and the high potential side terminal C1+ of the boost capacitance C1 is made connectable to a second reference potential terminal T2 via the switch SW3. Also, the low potential side terminal C20 of the boost capacitance C2 is made connectable to the grounding point via the switch SW2, and the high potential side terminal C2+ of the boost capacitance C2 is made connectable to the first reference potential terminal T1 via the switch SW1.

Further, the output terminal OUT1 and the high potential side terminal C2+ of the boost capacitance C2 are made connectable to each other via the switch SW5, and the low potential side terminal C2− of the boost capacitance C2 and the high potential side terminal C1+ of the boost capacitance C1 are made connectable to each other via the switch SW6. To the first reference potential terminal T1 is applied the output voltage VCI2 from the voltage follower 13C. Incidentally, a capacitance C10 connected to the first reference potential terminal T1 is intended for stabilizing the voltage supplied from the voltage follower 13C.

Figure 9A:
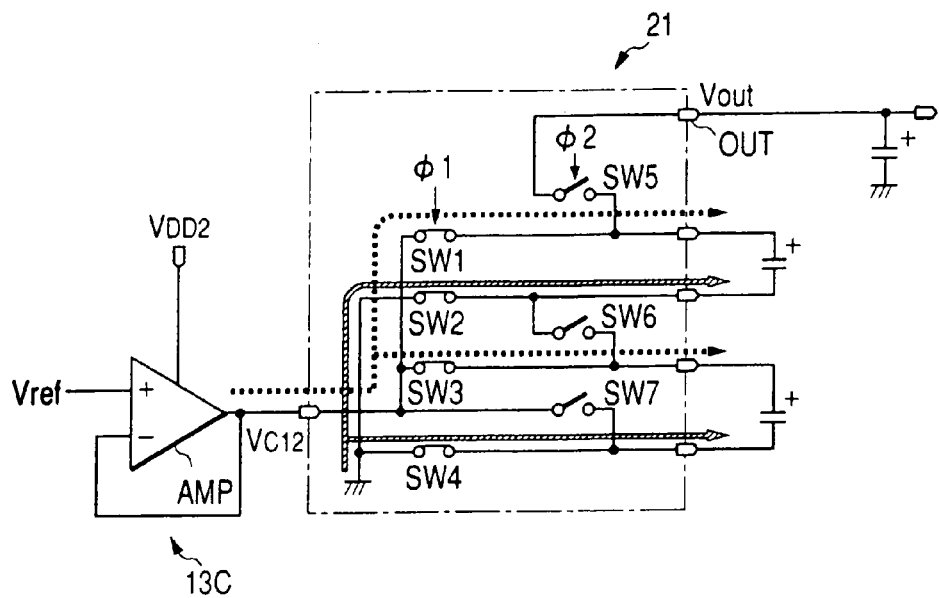
FIGS. 9(A) and 9(B) are diagrams for describing the actions of the boost circuit in the example.
Figure 9B:
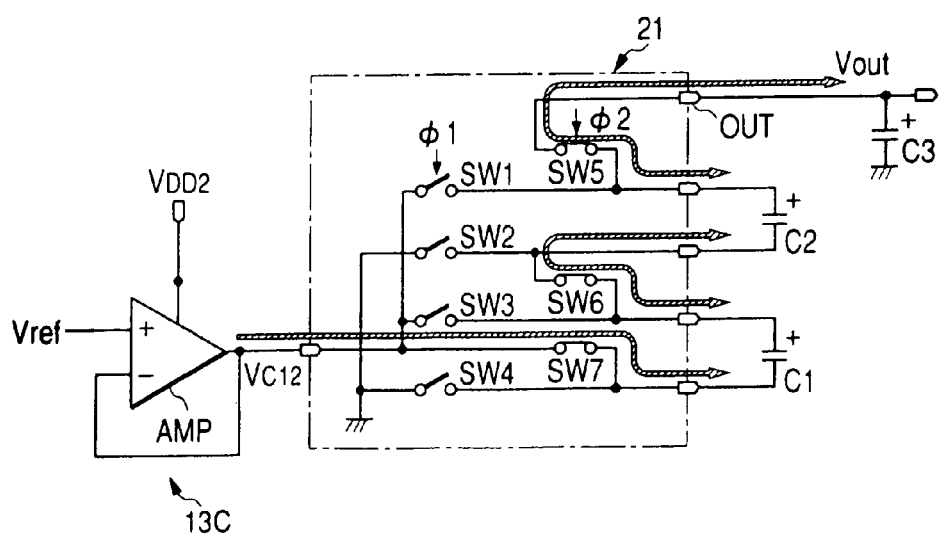

In the charge pump 20 configured as described, the boost capacitances C1 and C2 are charged to the reference voltage VCI2 when the clock signal φ1 is raised to a high level and the switches SW1 through SW4 are kept on (SW5 through SW7 are off then) as shown in FIG. 9A. Then, as the switches SW1 through SW4 are turned off, the switches SW5 through SW7 are turned on instead and the boost capacitances C1 and C2 are connected in series as shown in FIG. 9B, and the reference end side of the boost capacitance C1, i.e. the low potential side terminal C1− is connected to the first reference potential terminal T1 via the switch SW7. This results in thrusting up the voltage of the output terminal OUT1 to 3VCI2. By repeating the charging action and the boosting action, the charge provided to the boost capacitance C2 is transferred to the smooth capacitance C3 connected to the output terminal OUT1, and the boosted voltage VCOMH of 3VCI2 is supplied.

The voltage inverting circuit 22 is composed of a voltage terminal Ta to which the positive boosted voltage VCOMH generated by the charge pump 21 is applied; a second reference voltage terminal Tb to which the middle potential VMID of the liquid crystal generated by the voltage follower 13B is applied; a voltage inverting capacitance C21; switches SW8 and SW10 respectively connected between one of the terminals of the capacitance C21 and the voltage terminal Ta and between the terminal of the capacitance C21 and the voltage terminal Tb; switches SW9 and SW11 respectively connected between the other terminal of the voltage inverting capacitance C21 and the voltage terminal Tb and between that other terminal of the capacitance C21 and the output terminal Tc; and a smooth capacitance C22 for negative voltage connected between the output terminal Tc and the grounding point. To add, the capacitance C20 connected to the second reference potential terminal T2 is intended for stabilizing the voltage supplied from the voltage follower 13B.

The voltage inverting circuit in this embodiment turns the switches SW8 and SW9 on and the switches SW10 and SW11 with clocks so formed as not to allow their respective high level periods to overlap each other (see φ1 and φ2 in FIG. 8) to charge the voltage inverting capacitance C21 with a voltage corresponding to the potential difference between the positive boosted voltage VCOMH and the middle potential VMID of the liquid crystal. After that, it charges the smooth capacitance C22 connected to the output terminal OUT2 with the negative voltage VCOML whose polarity is reverse to that of the boosted voltage VCOMH around the middle potential VMID of the liquid crystal by turning the switches SW8 and SW9 off and the switches SW10 and SW11 off.

As described above, the power supply circuit for liquid crystal display driver embodying the invention in this way also excels in current efficiency over a like circuit using an amplifier, because the second boost circuit 20 for generating the common voltages VCOML and VCOMH is composed of a charge pump. Thus, generation of the common voltages VCOML and VCOMH with an amplifier requires an even higher voltage than the common voltages VCOML and VCOMH as the source voltage for the amplifier and accordingly is less efficient, but the direct driving of the common electrodes of the liquid crystal panel with a voltage boosted by a charge pump as in this embodiment serves to enhance the current efficiency.

Incidentally, as a charge pump is smaller in current supply capacity though excelling in current efficiency, its output level will drop if the load on the panel is great. However, as is evident from the waveform shown in FIG. 14C, the waveform for driving the common electrodes is low in frequency and accordingly the average load is small. Therefore, generation of the common voltages VCOML and VCOMH with a charge pump involves no problem whatsoever.

On the other hand, because the voltage waveform for driving the segment electrodes far more frequently varies than that for driving the common electrodes and accordingly imposes a greater average load, if the segment drive voltage is generated with a charge pump, the output of the charge pump may drop immediately after the start of displaying on the panel. If the output of the charge pump does drop, the accuracy of the output voltage will deteriorate, inviting the risk of application of a D.C. voltage to the liquid crystal, which might then be deteriorated. There may be the further trouble of impossibility to obtain satisfactory picture quality, such as discrepancy between display colors on a color liquid crystal display panel. However, in the embodiment of the invention described above, as the drive voltage for the segment electrodes subject to a heavy average load is generated by a voltage follower, there is no fear of any voltage drop, and accordingly the displayed picture quality can be prevented from deterioration.

The capacitance elements C1 through C3, C10, C20, C21, C22 and so forth shown in FIG. 7 are connected as external capacitances to the semiconductor chip on which the boost circuit shown in FIG. 7 is mounted. In this case, the external terminal for connecting the external capacitances and wiring for pulling out and connecting part of the wiring lines for supplying the boosted voltage VCOMH and negative voltage VCOML to the external terminal are provided on the semiconductor chip.

Furthermore, as already described, this embodiment is provided against latch-up with the ground short-circuiting switch 270 on the way of wiring for the feeding of the negative voltage VCOML generated by the voltage inverting circuit 21 to the substrate as the substrate bias voltage. In order to further increase the strength against latch-up of the LSI, even though it is already provided against latch-up, it is preferable to pull out the wiring for supplying the negative voltage VCOML to an external terminal and to connect an external diode to the external terminal. In that case, the diode for latch-up prevention can be connected to a common terminal with the external terminal to which the capacitance element C22 for stabilizing the generated negative voltage VCOML is to be connected. FIG. 7 illustrates how such a diode for latch-up prevention, identified as D1, is connected to the output OUT2 of the voltage inverting circuit 22.

Figure 10:
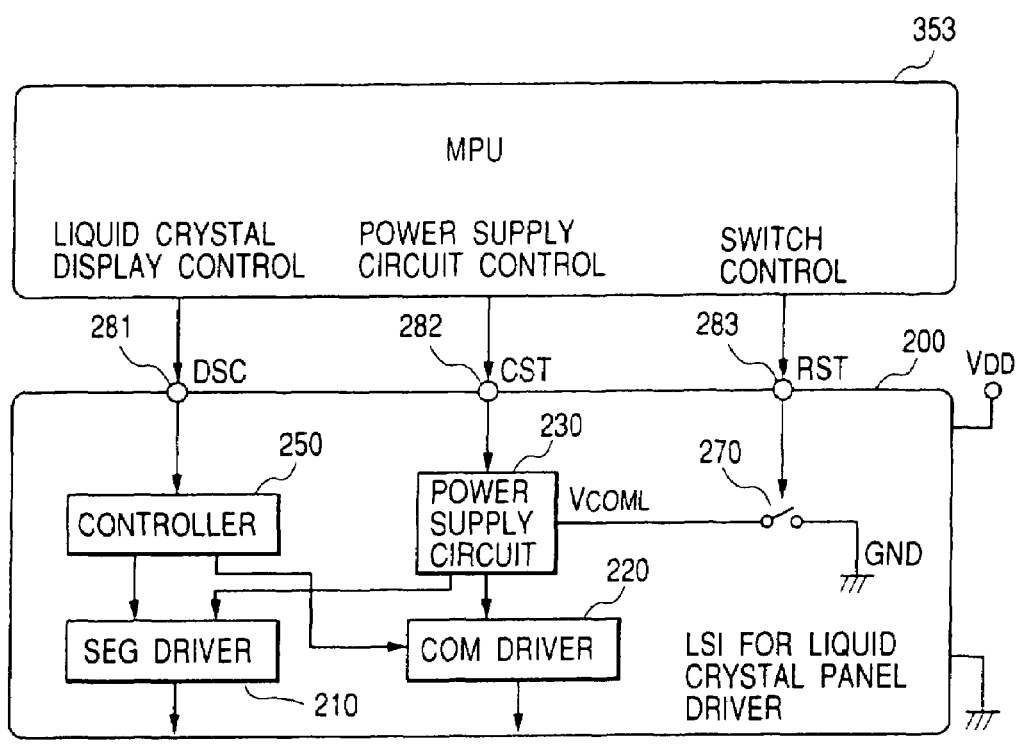
FIG. 10 is a block diagram illustrating an example of configuration of a liquid crystal display system consisting of a liquid crystal panel controller driver, which is another preferred embodiment of the invention, and a liquid crystal panel driven by this LSI.

FIG. 10 is a block diagram illustrating another example of liquid crystal display system consisting of a liquid crystal panel controller driver as a liquid crystal display control unit to which the present invention is applied and a liquid crystal panel driven by this driver.

In FIG. 10, reference numeral 200 denotes a liquid crystal panel controller driver, and 300, a liquid crystal panel driven by this liquid crystal panel controller driver 200. The liquid crystal panel controller driver 200 is configured of a SEG driver 210 for driving segment electrodes of the liquid crystal panel 300; a COM driver 220 for driving common electrodes of the liquid crystal panel 300; a power supply circuit for liquid crystal display driver 230 for generating the drive voltages required by these drivers; and a controller 250 for controlling the whole inside of the chip. These circuits are formed over a single semiconductor chip, such as single crystal silicon. In this embodiment, too, a short-circuiting switch 270 is provided on the way of wiring to supply the negative voltage VCOML generated by the power supply circuit 230 to the substrate for fixing the wiring to the ground. Reference numeral 353 denotes a microprocessor or microcomputer MPU for controlling this liquid crystal controller driver 200.

Though not illustrated, this liquid crystal panel controller driver 200 is further provided with an address counter for generating addresses for a display RAM for storing display data, a logic operating means for performing logic operations for watermark displaying and superimposed displaying on the basis of data read out of the display RAM and new display data supplied from an external MPU or elsewhere, and a timing generation circuit for generating operation timing signals for the SEG driver 210 and the COM driver 220. Though not illustrated either, as in FIG. 1, a display RAM for storing by a bit map method video data to be displayed on the liquid crystal panel 300 may also be built into the same chip as that mounting the power supply circuit for liquid crystal display driver.

Figure 11:
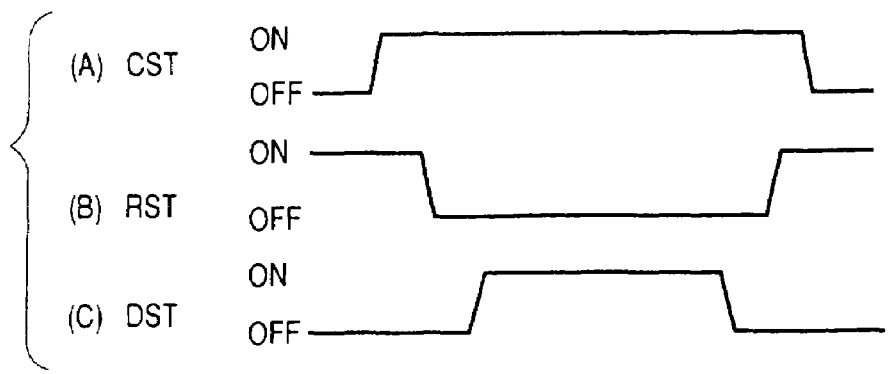
FIG. 11 is a timing chart showing the timings of control signals in the second embodiment of the invention.

In this embodiment, a display start signal DSC for the controller 250 of the liquid crystal controller driver 200, a boost start signal CST for the power supply circuit for liquid crystal display driver, and a control signal RST for turning on and off the ground short-circuiting switch 270 (reset signal) are generated by the MPU 353 for control use and supplied to the liquid crystal panel controller driver 200. To make these actions possible, the liquid crystal controller driver 200 is provided with external terminals 281, 282 and 283 for receiving the control signals DSC, CST and RST mentioned above, which are supplied from an external MPU or elsewhere. FIG. 11 shows the timings of the control signals DSC, CST and RST supplied from the MPU 353 for control use to the liquid crystal panel controller driver 200.

As is seen from FIG. 11, until a prescribed length of time T0 passes after the control signal DSC starts up the operation of the power supply circuit 230, the control signal RST is kept at a high level, and the tuning-on of the short-circuiting switch 270 fixes the substrate potential to the ground to prevent any latch-up from occurring. Some time after the control signal RST is brought down to a low level and the short-circuiting switch 270 is turned off, the control signal DSC is varied to a high level start liquid crystal displaying.

Figure 12:
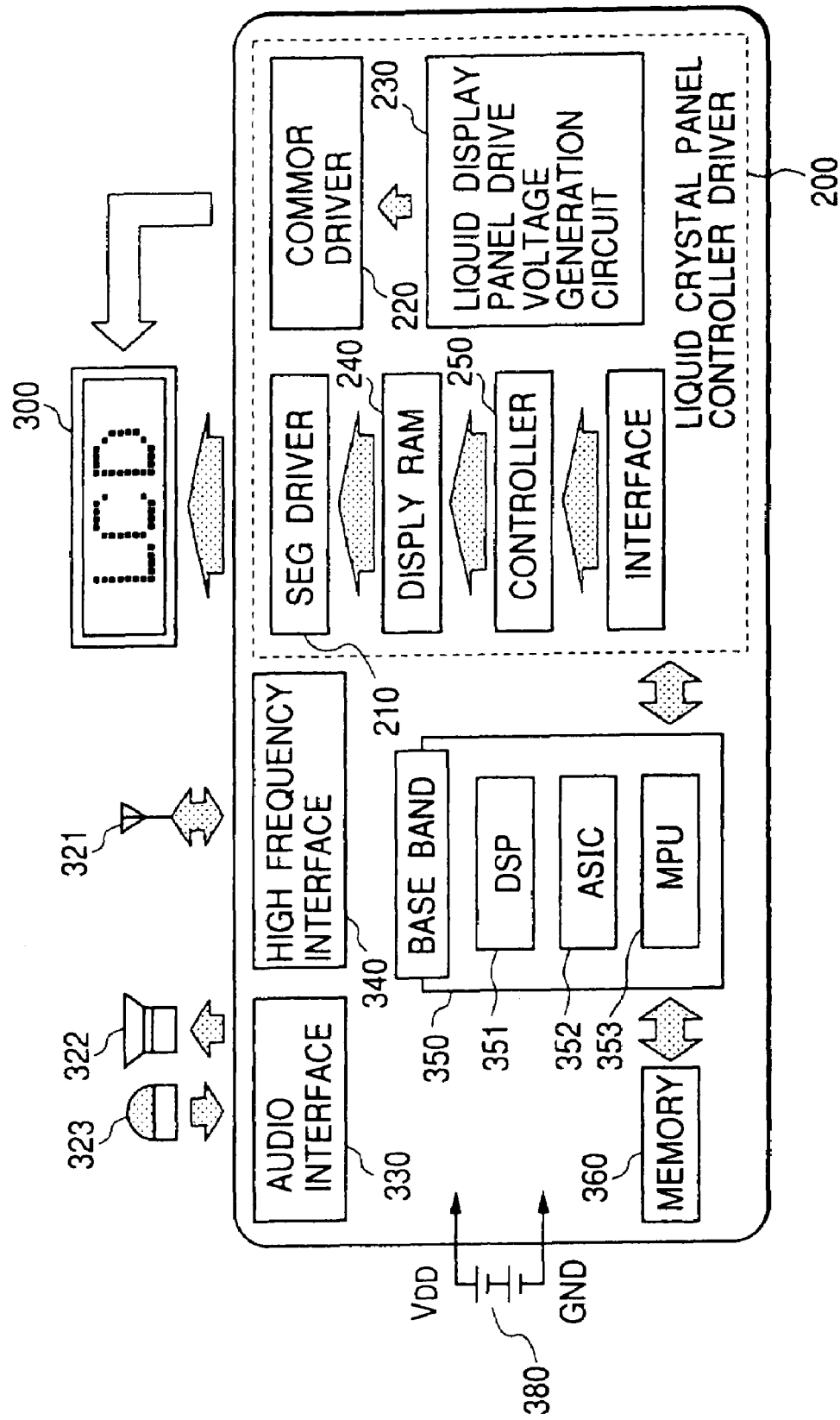
FIG. 12 is a block diagram illustrating the overall configuration of a mobile telephone provided with a liquid crystal panel controller driver to which the invention is applied.

FIG. 12 is a block diagram illustrating the overall configuration of a mobile telephone as a typical application of the liquid crystal display unit consisting of the liquid crystal panel controller driver 200 and the liquid crystal panel 300 shown in FIG. 1 and FIG. 10.

The mobile telephone embodying the invention in this way is provided with the liquid crystal panel 300 as the display unit; an antenna 321 for transmission/reception use; a loudspeaker 322 for audio output; a microphone 323 for audio input; the liquid crystal panel controller driver 200 to which the invention is applied; an audio interface 330 for inputting and outputting signals to and from the loudspeaker 322 and the microphone; a high frequency interface 340 for inputting and outputting signals to and from the antenna 321; a digital signal processor (DSP) 351 for processing audio signals and transmit/receive signals; application specific integrated circuits (ASIC) 352 for providing custom functions (user logic); a system control unit 353, consisting of a microprocessor or a microcomputer, for performing controls over the whole apparatus including display control; a memory 360 for storing data and programs; and a battery 380 for supplying power to the mobile telephone. A so-called base band unit 350 is configured of the DSP 351, ASIC 352 and MPU 353 as the system control unit.

The liquid crystal panel 300 may, though not limited to, consist of a dot matrix type pane. in which a large number of display pixels are arrayed in a matrix. If the liquid crystal panel is for color displaying, each pixel consists of three dots including red, blue and green ones. The memory 360, consisting of a flash memory or the like permitting collective erasion block by block, stores control programs and control data for the whole mobile telephone system including display control, and also has the functions of a character generator read only memory (CGROM), which is a pattern memory in which display data including character fonts as two-dimensional display patterns are stored.

Figure 13:
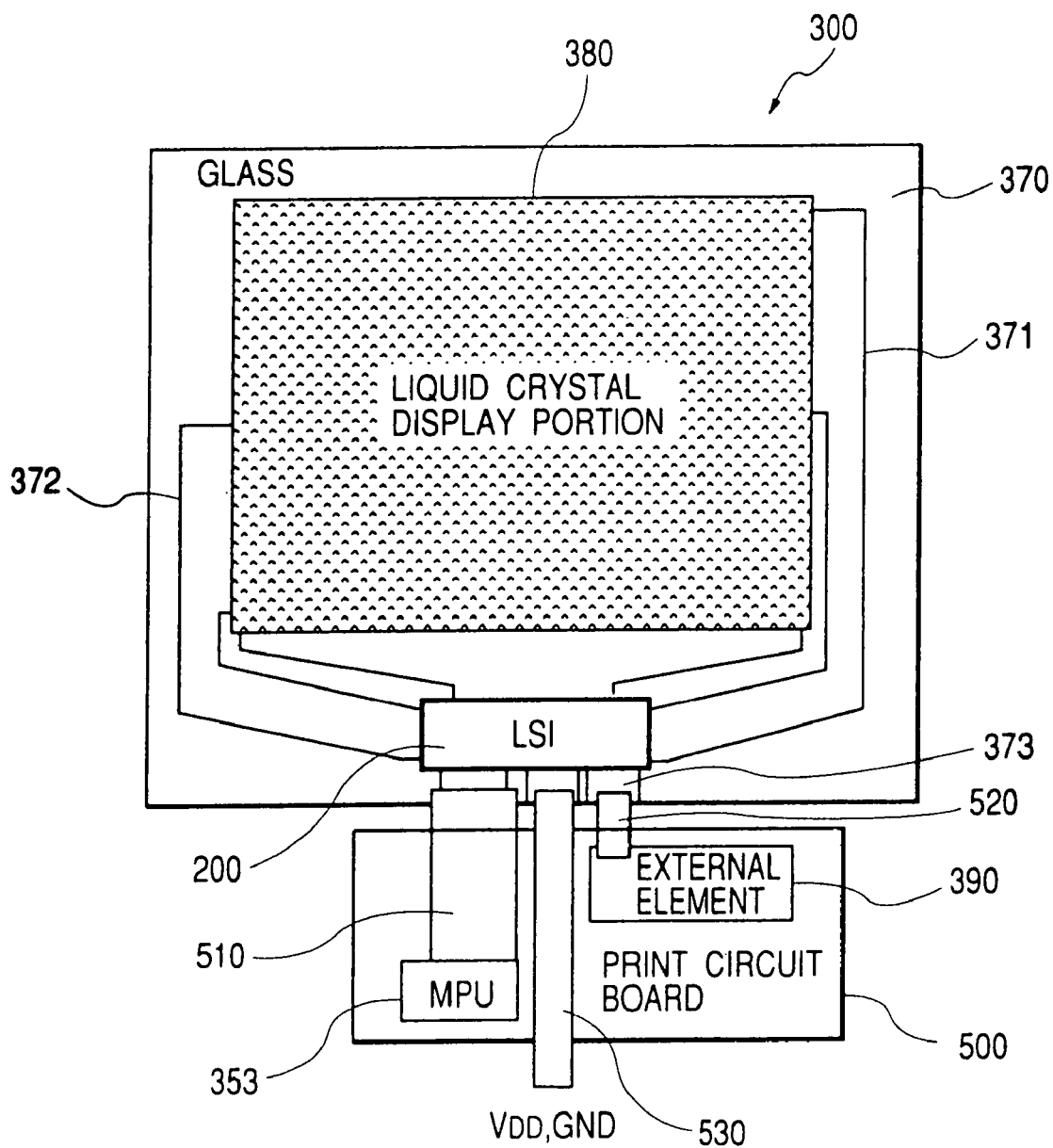
FIG. 13 shows a plan of en example of packaging of a liquid crystal panel controller driver to which the invention is applied.

FIG. 13 shows a liquid crystal module in a state in which a liquid crystal panel controller driver 200 to which the invention is applied is packaged on a chip on glass (COG) basis into the liquid crystal panel 300.

In FIG. 13, reference numeral 370 denotes a glass substrate constituting the liquid crystal panel 300; 380, an opposite substrate holding liquid crystals between it and the glass substrate 370 to constitute a display portion; and 371 and 372, draw-out wiring lines consisting of ITO and the like, formed over the glass substrate 370 and their ends are gathered on one side of the substrate. By melt-deposition with solder balls or the like intervening between ends of these wiring lines 371 and 372 and the matching electrode pads (external terminals) of the liquid crystal controller driver 200, the liquid crystal controller driver 200 is packaged over the liquid crystal panel.

Further, reference numeral 500 denotes a print circuit board over which the microprocessor (MPU) 353 for controlling the liquid crystal controller driver 200 and external elements 390 including capacitances and diodes are packaged. On the print circuit board 500, the microprocessor (MPU) 353, the external elements 390 and the liquid crystal controller driver 200 on the liquid crystal panel 300 side are connected by flexible printed circuit boards (FPC) 510 and 520 coupled to terminals provided at an end of the glass substrate 370 via heat seals or the like. In addition, the configuration provides for the supply of the source voltage VDD and the ground potential GND to the liquid crystal panel 300 by another FPC 530 for power feed use, connected to a terminal at an end of the glass substrate 370. The terminal at the end of the glass substrate 370 and the liquid crystal controller driver 200 are also connected by wiring 373 consisting of ITO or the like.

The invention by the present inventors has been specifically described above with reference to preferred embodiments thereof, but obviously the present invention is not limited to the foregoing embodiments, and can be modified in various ways without deviating from the essentials thereof. For instance, while the embodiments is provided with the voltage inverting circuit 22 for generating the negative voltage VCOML by inverting the positive voltage VCOMH generated by the charge pump 21, the invention can also be applied to a semiconductor integrated circuit mounted with a power supply circuit in which a charge pump having a similar configuration to the charge pump 21 directly generates a negative voltage.

Further, although the liquid crystal controller driver 200 in the embodiments uses a P-type single crystal substrate, this may be replaced with an N-type substrate. In that case, for instance, either a power supply short-circuiting switch maybe provided between the N-type substrate to which a positive voltage, such as VCOMH, generated by the power supply circuit and the VDD wiring or a ground short-circuiting switch may be provided between the P-well region to which a negative voltage, such as VCOML, generated by the power supply circuit and the ground wiring to suppress the fluctuations of the well potential at the time the power supply is started and up, and any latch-up can be thereby prevented.

Although the foregoing description of the invention mainly concerned a liquid crystal panel controller driver for driving the liquid crystal panel of a mobile telephone, which was the background of the present inventors' inventive attempt, the invention is not limited to this application, but can as well be applied effectively to various other electric equipment having a liquid crystal panel including pocket bells, pagers and personal digital assistants PDA.

What follows is a brief summary of the advantages provided by typical aspects of the present invention disclosed in this application. Thus, according to the invention, it is possible to realize a power supply circuit susceptible to little current loss and capable of generating an accurate boosted voltage. When applied to a power supply circuit for liquid crystal display driver using the circuit for generating a voltage to drive a liquid crystal panel, the liquid crystals will be less susceptible to deterioration and make possible picture displaying of high quality. A liquid crystal display unit and mobile electric equipment consuming less power and therefore capable of running on a battery for many hours can be thereby provided.

What is claimed is:

1. A display controller on a semiconductor substrate and for use with a display panel having first electrodes and second electrodes, the display controller comprising:

a power supply circuit coupled to receive an external source voltage, the power supply circuit generating a voltage to be applied to the first electrodes of the display panel and generating a positive voltage higher than the external source voltage or a negative voltage lower than a ground potential, the positive voltage and the negative voltage being to be applied to the second electrodes of the display panel;

a first wiring feeding the negative voltage as a bias voltage to the semiconductor substrate;

a second wiring supplying the ground potential;

a switch element coupled between the first wiring and the second wiring; and a circuit which generates a first control signal to make the switch element conduct temporarily in accordance with a second control signal for starting up the power supply circuit.

2. A display controller according to claim 1, wherein the switch element is temporarily made to conduct at the time of starting up the power supply circuit to set a potential of the semiconductor substrate, to which the negative voltage is to be applied, temporarily to the ground potential.

3. A display controller according to claim 1, wherein the switch element includes a high voltage withstand MOSFET.

4. A display controller according to claim 1, wherein the display controller includes:

a first operating mode in which a display operation is performed in a state of a source voltage being supplied from an outside of the liquid crystal display controller, and a second operating mode in which a display operation is not performed in a state of a source voltage being supplied from the outside of the liquid crystal display controller, wherein, when changing from the second operating mode to the first operating mode, the switch element is temporarily made to conduct to temporarily apply the ground potential to the substrate, to which the negative voltage should be applied.

5. A display controller according to claim 1, further comprising:

an oscillating circuit, wherein the liquid crystal display controller has:

a first operating mode in which the oscillating circuit is operated to perform a displaying operation in a state of a source voltage being supplied from an outside of the liquid crystal display controller, and a second operating mode in which the operation of the oscillating circuit is stopped not to perform the displaying operation in a state of a source voltage being supplied from the outside of the liquid crystal display controller, wherein, when changing from the second operating mode to the first operating mode, the switch element is temporarily made conduct to set the potential of the semiconductor substrate, to which the negative voltage is to be applied, temporarily to the ground potential.

6. A display controller according to claim 1, further comprising:

an external terminal to which a signal for an on/off control of the switch element is inputted.

7. A display controller on a semiconductor substrate and for use with a display panel having first electrodes and second electrodes, the display controller comprising:

a power supply circuit coupled to receive an external source voltage, the power supply circuit generating a voltage to be applied to the first electrodes of the display panel and generating a positive voltage higher than the external source voltage or a negative voltage lower than a ground potential, the positive voltage and the negative voltage being to be applied to the second electrodes of the display panel;

a first wiring feeding the negative voltage as a bias voltage to the semiconductor substrate;

a second wiring supplying the ground potential;

a switch element coupled between the first wiring and the second wiring;

a circuit which generates a first control signal to make the switch element conduct temporarily in accordance with a second control signal for starting up the power supply circuit;

a first drive circuit which supplies signals for driving the first electrodes of the display panel on the basis of a voltage generated by the power supply circuit; and a second drive circuit which supplies signals for driving the second electrodes of the display panel on the basis of a voltage generated by the power supply circuit.

8. A display controller according to claim 7,
wherein the switch element is temporarily made to conduct at the time of starting up the power supply circuit to set a potential of the semiconductor substrate, to which the negative voltage is to be applied, temporarily to the ground potential.

9. A display controller according to claim 7,
wherein the switch element includes a high voltage withstand MOSFET.

10. A display controller according to claim 7,
wherein elements constituting the second drive circuit are comprised of MOSFETs higher in voltage withstand than the elements constituting the power supply circuit for liquid crystal display driver, and
wherein the switch element is comprised of a voltage withstand MOSFET having the same structure as the elements constituting the second drive circuit.

11. A display controller according to claim 7,
wherein the display controller includes:
    a first operating mode in which a display operation is performed in a state of a source voltage being supplied from an outside of the liquid crystal display controller, and
    a second operating mode in which a display operation is not performed in a state of a source voltage being supplied from the outside of the liquid crystal display controller,
wherein, when changing from the second operating mode to the first operating mode, the switch element is temporarily made to conduct to temporarily apply the ground potential to the substrate, to which the negative voltage should be applied.

12. A display controller according to claim 7, further comprising:
an oscillating circuit,
wherein the liquid crystal display controller has:
    a first operating mode in which the oscillating circuit is operated to perform a displaying operation in a state of a source voltage being supplied from an outside of the liquid crystal display controller, and
    a second operating mode in which the operation of the oscillating circuit is stopped not to perform the displaying operation in a state of a source voltage being supplied from the outside of the liquid crystal display controller,
wherein, when changing from the second operating mode to the first operating mode, the switch element is temporarily made conduct to set the potential of the semiconductor substrate, to which the negative voltage is to be applied, temporarily to the ground potential.

13. A display controller according to claim 7, further comprising:
an external terminal to which a signal for an on/off control of the switch element is inputted.

* * * * *